US009616889B2

(12) United States Patent
Lee

(10) Patent No.: US 9,616,889 B2
(45) Date of Patent: Apr. 11, 2017

(54) CRUISE CONTROL SYSTEM AND METHOD

(71) Applicant: HANWHA TECHWIN CO., LTD., Changwon-si (KR)

(72) Inventor: Jinhan Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/716,483

(22) Filed: May 19, 2015

(65) Prior Publication Data

US 2016/0090087 A1 Mar. 31, 2016

(30) Foreign Application Priority Data

Sep. 30, 2014 (KR) ........................ 10-2014-0132021

(51) Int. Cl.
*B60W 30/14* (2006.01)

(52) U.S. Cl.
CPC ....... *B60W 30/143* (2013.01); *B60W 2550/14* (2013.01)

(58) Field of Classification Search
CPC ........... B60W 30/143; B60W 2550/14; B60W 2550/30; B60W 30/06; B60W 2420/40; B60W 30/14; B60W 40/072; B60W 30/12; B60W 2710/207; B60W 2550/20; B60W 30/18163; B60W 40/10; B60W 10/04; B60T 2201/02; B60T 2201/08; B60T 8/32; B60T 2210/24; B60R 2300/804; B60R 21/013; B60R 2300/8086; G08G 1/167; G08G 1/166
USPC .............. 701/93, 41, 28, 301, 70, 58, 68, 72
See application file for complete search history.

(56) References Cited

U.S. PATENT DOCUMENTS

| | | | | |
|---|---|---|---|---|
| 8,170,739 | B2 | 5/2012 | Lee | |
| 2006/0041356 | A1* | 2/2006 | Shirato .................... | B62D 1/28 701/41 |
| 2008/0091327 | A1* | 4/2008 | Tsuchiya ............ | B60K 31/0066 701/93 |
| 2009/0319113 | A1* | 12/2009 | Lee ...................... | B62D 15/025 701/25 |
| 2014/0172220 | A1 | 6/2014 | You | |

FOREIGN PATENT DOCUMENTS

| | | |
|---|---|---|
| KR | 10-1356203 | 1/2014 |
| KR | 10-1371866 B1 | 3/2014 |
| KR | 10-1439019 B1 | 9/2014 |

* cited by examiner

*Primary Examiner* — Marthe Marc-Coleman
(74) *Attorney, Agent, or Firm* — Sughrue Mion, PLLC

(57) ABSTRACT

Provided are a cruise control system for controlling a driving device and a corresponding method. The cruise control system includes: an information collector configured to obtain road information and driving information; a first path generator configured to generate a first change path connecting a first lane changing start point and a first lane changing end point on a straight road, based on the road information and the driving information; and a second path generator configured to generate a driving road corresponding to an actual road from the straight road, based on the road information, and generate a second change path connecting a second lane changing start point and a second lane changing end point on the driving road.

20 Claims, 7 Drawing Sheets

10a
100 INFORMATION COLLECTOR
200 FIRST PATH GENERATOR
300 SECOND PATH GENERATOR
20 SENSOR
30 DRIVING CONTROLLER

CRUISE CONTROL SYSTEM AND METHOD

CROSS-REFERENCE TO THE RELATED APPLICATION

This application claims priority from Korean Patent Application No. 10-2014-0132021, filed on Sep. 30, 2014, in the Korean Intellectual Property Office, the disclosure of which is incorporated herein in its entirety by reference.

BACKGROUND

1. Field

Apparatuses and methods consistent with exemplary embodiments relate to a cruise control system and method.

2. Description of the Related Art

There is a growing need for unmanned autonomous driving of an automatic driving apparatus by using an automatic driving apparatus control system. For unmanned autonomous driving, a function of changing lanes on a straight road and a curved road is required. When a current lane is changed to another lane on a curved road, it is required not to invade lanes other than the current lane and the other lane so as not to collide with another driving apparatus and objects surrounding a road, and instead, to appropriately change to the other lane.

SUMMARY

Exemplary embodiments are directed to providing a safe path for changing lanes on a road without invading lanes other than a current lane and a lane to be moved to.

Various aspects will be set forth in part in the description which follows and, in part, will be apparent from the description, or may be learned by practice of the presented embodiments.

According to an exemplary embodiment, there is provided a cruise control system for controlling a driving device. The system may include: an information collector configured to obtain road information and driving information; a first path generator configured to generate a first change path connecting a first lane changing start point and a first lane changing end point on a straight road, based on the road information and the driving information; and a second path generator configured to generate a driving road corresponding to an actual road from the straight road, based on the road information, and generate a second change path connecting a second lane changing start point and a second lane changing end point on the driving road.

The driving information may include speed of the driving device, and the road information may include a width of at least one lane in the actual road and a shape of the actual road.

The first path generator may calculate a moving distance that is proportional to the speed of the driving device, and determine, as the first lane changing end point, a point spaced from the first lane changing start point by the moving distance in a first axis parallel to the straight road and spaced from the first lane changing start point by a distance proportional to a width of the lane in a second axis perpendicular to the first axis.

The first path generator may calculate a plurality of moving distances that are proportional to the speed of the driving device, and determine, as a plurality of first lane changing end points, points spaced from the first lane changing start point by one of the plurality of moving distances in a first axis parallel to the straight road and spaced from the first lane changing start point by a distance proportional to the width of the lane in a second axis perpendicular to the first axis.

The second path generator may generate a plurality of second change paths connecting a second lane changing start point and a plurality of second lane changing end points, respectively, on the driving road, wherein the second lane changing start point corresponds to the first lane changing start point, and the plurality of second lane changing end points correspond to the plurality of first lane changing end points, respectively.

The cruise control system may further include a path selector for determining a degree of risk of each of the plurality of second change paths, and selecting one second change path, of which the degree of risk is minimum, among the plurality of second change paths.

The degree of risk may be a value representing a probability that the driving device will collide with a moving object near the driving device while the driving device moves along the second change path.

The degree of risk may be inversely proportional to a distance between the driving device and the moving object.

The second path generator may generate the driving road by bending the straight road along the shape (tangent and curvature) of the actual road.

The second path generator may generate the second change path based on a location, orientation, and curvature of a point on a current lane of the driving road.

According to another exemplary embodiment, there is provided a cruise control method performed on a driving device. The method may include: obtaining road information and driving information; generating a first change path connecting a first lane changing start point and a first lane changing end point on a straight road, based on the road information and the driving information; and generating a driving road corresponding to an actual road from the straight road, based on the road information, and generating a second change path connecting a second lane changing start point and a second lane changing end point on the driving road.

The driving information may include speed of the driving device, and the road information may include a width of at least one lane in the actual road and a shape of the actual road.

The generating the first change path may include: calculating a moving distance that is proportional to the speed of the driving device; and determining, as the first lane changing end point, a point spaced from the first lane changing start point by the moving distance in a first axis parallel to the straight road and spaced from the first lane changing start point by a distance proportional to a width of the lane in a second axis perpendicular to the first axis.

The generating of the first change path may include calculating a plurality of moving distances that are proportional to the speed of the driving device; and determining, as a plurality of first lane changing end points, points spaced from the first lane changing start point by one of the plurality of moving distances in a first axis parallel to the straight road and spaced from the first lane changing start point by a distance proportional to the width of the lane in a second axis perpendicular to the first axis.

The generating of the second change path may include generating a plurality of second change paths connecting a second lane changing start point and a plurality of second lane changing end points, respectively, on the driving road, wherein the second lane changing start point corresponds to the first lane changing start point, and the plurality of second lane changing end points correspond to the plurality of first lane changing end points, respectively.

The method may further include determining a degree of risk of each of the plurality of second change paths, and selecting one second change path, of which the degree of risk is minimum, among the plurality of second change paths.

The degree of risk may be a value representing a probability that the driving device will collide with a moving object near the driving device while the driving device moves along the second change path.

The degree of risk may be inversely proportional to a distance between the driving device and the moving object.

The generating of the second change path may include generating the driving road by modifying the straight road based on the shape of the actual road.

The generating of the second change path may include generating the second change path based on a location, orientation, and curvature of a point on a current lane of the driving road.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION OF THE EXEMPLARY EMBODIMENTS

Figure 1:
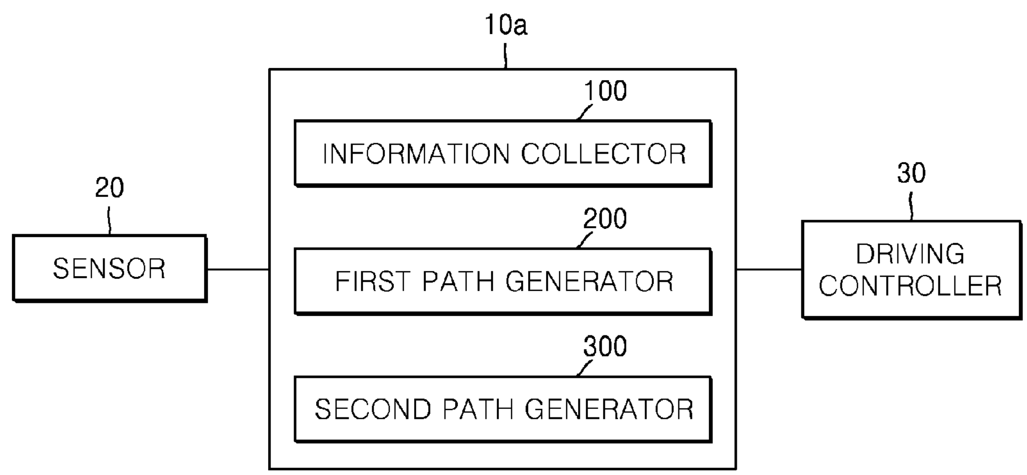
FIG. 1 is a schematic block diagram of a cruise control system, according to an exemplary embodiment.

Reference will now be made in detail to exemplary embodiments which are illustrated in the accompanying drawings. However, the inventive concept is not limited to the exemplary embodiments set forth herein and should be understood as covering all modifications, equivalents, and alternatives falling within the technical idea and scope of the inventive concept. In the following description, well-known functions or constructions are not described in detail if it is determined that they would obscure the inventive concept due to unnecessary detail. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms 'first', 'second', 'third', etc., may be used herein to describe various elements, components, regions, layers and/or sections, these elements, components, regions, layers and/or sections should not be limited by these terms. These terms are only used to distinguish one element, component, region, layer or section from another region, layer or section.

The terminology used herein is for the purpose of describing particular embodiments only and is not intended to be limiting of the inventive concept. As used herein, the singular forms 'a', 'an' and 'the' are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The inventive concept may be represented using functional block components and various operations. Such functional blocks may be realized by any number of hardware and/or software components configured to perform specified functions. For example, the inventive concept may employ various integrated circuit components, e.g., memory, processing elements, logic elements, look-up tables, and the like, which may carry out a variety of functions under control of at least one microprocessor or other control devices. As the elements of the inventive concept are implemented using software programming or software elements, the inventive concept may be implemented with any programming or scripting language such as C, C++, Java, assembler, or the like, including various algorithms that are any combination of data structures, processes, routines or other programming elements. Functional aspects may be realized as an algorithm executed by at least one processor. Furthermore, the inventive concept may employ conventional techniques for electronics configuration, signal processing and/or data processing. The terms 'mechanism', 'element', 'means', 'configuration', etc. are used broadly and are not limited to mechanical or physical embodiments. These terms should be understood as including software routines in conjunction with processors, etc. In addition, two or more functional block components may be implemented as a single component to perform all of operations or functions of the two or more functional block components.

Hereinafter, exemplary embodiments will be described in detail with reference to the accompanying drawings.

FIG. 1 is a schematic block diagram of a cruise control system 10*a*, according to an exemplary embodiment.

Referring to FIG. 1, the cruise control system 10*a* according to an exemplary embodiment may be a system that controls movement of a driving device or an automatic driving device (e.g., a vehicle, a robot, etc.), and may be installed in the driving device. The cruise control system 10*a* may generate a lane change path for the driving device to move from a current lane to a target lane on a road along which the driving device is driven, in response to a lane change request or automatically. In the present disclosure, it is assumed that the driving device is a vehicle.

The cruise control system 10*a* may include an information collector 100, a first path generator 200, and a second path generator 300.

The information collector 100 may obtain road information and driving information by receiving a sensing signal from a sensor 20 connected thereto. The road information may include geometric information about a road, e.g., lanes of the road, a width of the lanes, a form (curvature) of the road, etc. The driving information may include information about movement of the vehicle, e.g., a location, a moving direction, driving speed, a steering angle, a yaw rate, and the like thereof.

The sensor 20 may include a vision recognition device (such as a camera), an infrared sensor, a radar or lidar sensor, etc. attached to the vehicle. The sensor 20 may have a form in which at least one sensor is used individually or in combination. The sensor 20 may be installed in a front, rear, or side portion of or any appropriate point on the vehicle. Surrounding information about the road obtained via the sensor 20 may vary according to a type of the sensor 20 attached to the vehicle. The surrounding information may be obtained with respect to the entire road or only a portion of the road including a current lane along which the vehicle is being driven or lanes between the current lane and a lane to which the vehicle is to move to. As another example, the sensor 20 may be installed in the vicinity of the road, and the information collector 100 may receive the road information by wirelessly receiving a sensing signal from the sensor 20.

Examples of the sensor 20 may include a global positioning system (GPS), a speedometer, a steering angle sensor, a yaw rate sensor, a gravity sensor, etc. which are attached to the driving vehicle. The information collector 100 may obtain driving information about the vehicle by receiving one or more values sensed by the sensor 20.

The first path generator 200 may generate a straight road including the current lane, a target lane, and at least one lane between the current lane and the target lane, and generate a first change path which is a continuous path connecting a first lane changing start point and a first lane changing end point on the straight road. The current lane may be a lane at which lane changing starts and the target lane may be a lane at which lane changing ends. The straight road is a virtual road for generating the first change path. The first lane changing start point is a location on the current lane of the straight road at which the vehicle starts changing lanes. The first lane changing end point is a location on the target lane of the straight road at which the vehicle ends changing lanes.

The first path generator 200 may determine the first lane changing end point on the straight road, based on a driving speed of the vehicle and a width of the lanes. The first path generator 200 may receive information about locations, orientations and steering angles of the first lane changing start point and the first lane changing end point, and generate the first change path based on a polynomial (e.g., a sixth-order polynomial) using the above information as coefficients.

The second path generator 300 generates a driving road corresponding to an actual road, on which the vehicle is currently being driven, by reflecting a form of the actual road into a straight road, and generates a second change path which is a continuous path connecting a second lane changing start point and a second lane changing end point on the driving road. The driving road is a virtual road approximated to an actual road by modifying the straight road generated by the first path generator 200, based on a form (shape, curvature, etc.) of the actual road. The driving road may include a straight road with a curvature of '0' and a curved road with a curvature greater than '0'. The second lane changing start point is a location on a current lane of the driving road at which the vehicle starts changing lanes, and corresponds to the first lane changing start point. The second lane changing end point is a location at which the vehicle ends changing lanes at a target lane of the driving road, and corresponds to the second lane changing end point.

The second path generator 300 may generate the driving road by modifying (e.g., bending) the straight road generated by the first path generator 200 according to the form of the actual road. The second path generator 300 may generate the second change path on the driving road by reflecting information about the form of the actual road into the first change path. Since the driving road is generated to reflect the form of the actual road, the second change path may be also generated to reflect the form of the actual road.

A location of a point on the second change path may be expressed based on a location, orientation, and curvature of a point on the current lane (a centerline of the current lane) on the driving road. The location of the point on the second change path may be expressed based on the location and orientation of the point on the current lane (the centerline of the current lane) on the driving road. The orientation of the point on the second change path may be expressed based on the orientation of the point on the current lane. The orientation of the point on the current lane may be expressed as an angle formed by a tangent at the second lane changing start point and a tangent at the point on the current lane. That is, the orientation of the point on the current lane should be understood as an angle of a road inclined at the location of the point on the current lane with respect to an x-axis. The curvature of the point on the second change path may be expressed based on the curvature of the point on the current lane.

A driving controller 30 included in the vehicle may generate a control signal for controlling the orientation of the vehicle, based on the second change path generated by the cruise control system 10*a*. Speed of the vehicle and directions of wheels and a steering wheel of the vehicle may be controlled according to the control signal so as to change lanes by using the second change path as a lane change path.

The cruise control system 10*a* may further include a storage unit (such as a memory) in which a road map has been previously stored, and may detect the form of a road and the orientation of the vehicle being driven on the road while being interlinked with a GPS.

Figure 2:
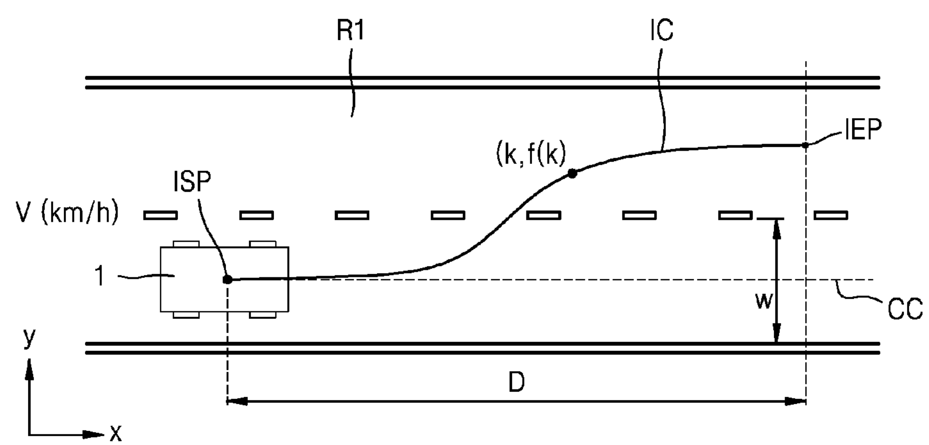
FIG. 2 is a diagram illustrating a method of generating a first change path by using a first path generator of FIG. 1, according to an exemplary embodiment.

FIG. 2 is a diagram illustrating a method of generating a first change path by using the first path generator 200 of FIG. 1, according to an exemplary embodiment.

For convenience of explanation, in FIG. 2, a case in which a vehicle performs lane changing between two lanes, i.e., a current lane and an adjacent lane which is a target lane will be described. In this case, it is assumed that the vehicle is being driven along a center of a lane.

Referring to FIG. 2, according to an exemplary embodiment, the first path generator 200 generates a first change path IC connecting a first lane changing start point ISP and a first lane changing end point IEP with respect to a vehicle 1 driven along a straight road R1.

An x-axis direction is parallel to the straight road R1, and a y-axis direction is perpendicular to the x-axis direction. The location of the vehicle on the straight road R1 may be expressed with x and y coordinates. The origin on an x, y coordinate system may be set such that the coordinates of the location of the first lane changing start point (ISP) is (0,0).

A moving distance D may be determined to be proportional to a driving speed V of the vehicle 1. The moving distance D is a linear distance in the x-axis direction for the vehicle 1 to move from the first lane changing start point ISP to the first lane changing end point IEP. That is, the moving distance D on the straight road R1 is the difference between a value of the first lane changing start point ISP in the x-axis direction and a value of the first lane changing end point IEP in the x-axis direction. For example, the moving distance D on the straight road R1 may be expressed by Equation 1 including constants m1 and m2 below.

$$D=m_1V+m_2 \quad (1)$$

The difference between a value of the first lane changing start point ISP in the y-axis direction and a value of the first lane changing end point IEP in the y-axis direction may be set to be equal to a lane width W.

The first path generator 200 may calculate the moving distance D in the x-axis direction for changing lanes on the straight road R1, based on the driving speed of the vehicle. The first path generator 200 may determine the first lane changing end point IEP with an x-axis value corresponding to the moving distance D and the y-axis value corresponding to the lane width W as coordinates thereof, based on the first lane changing start point ISP as a reference point (a starting point).

The first change path IC may be a continuous path connecting the first lane changing start point ISP and the first lane changing end point IEP on the straight road R1. When the coordinates of a point on the first change path IC are expressed as (x, f(x)), f(x) may be expressed by, for example, Equation 2 below.

$$f(x)=a_0+a_1x+a_2x^2+a_3x^3+a_4x^4+a_5x^5+a_6x^6 \quad (2)$$

Equation 3 below may be calculated using f(x), an equation for differentiating f(x) by 'x' once, an equation for differentiating f(x) by 'x' twice, and an equation for differentiating f(x) by 'x' three times.

$$\begin{bmatrix} f(0) \\ f'(0) \\ f''(0) \\ f(k) \\ f'(k) \\ f''(k) \\ f'''(k) \end{bmatrix} = \begin{bmatrix} 1 & 0 & 0 & 0 & 0 & 0 & 0 \\ 0 & 1 & 0 & 0 & 0 & 0 & 0 \\ 0 & 0 & 2 & 0 & 0 & 0 & 0 \\ 1 & k & k^2 & k^3 & k^4 & k^5 & k^6 \\ 0 & 1 & 2k & 3k^2 & 4k^3 & 5k^4 & 6k^5 \\ 0 & 0 & 2 & 6k & 12k^2 & 20k^3 & 30k^4 \\ 0 & 0 & 0 & 6 & 24k & 60k^2 & 120k^3 \end{bmatrix} \times \begin{bmatrix} a_0 \\ a_1 \\ a_2 \\ a_3 \\ a_4 \\ a_5 \\ a_6 \end{bmatrix}, \quad (3)$$

where 'k' denotes a distance by which the vehicle 1 moves along the current lane (a centerline of the current lane) CC. Since the x-axis is set to be parallel to the straight road R1, the distance k on the straight road R1 may denote an x-axis value with respect to the first lane changing start point ISP.

'f(0)' may denote a y-axis value of the vehicle 1 when lane changing starts. 'f'(0)' may denote a degree to which the vehicle 1 is inclined with respect to the x-axis when lane changing starts. 'f''(0)' may denote a variation in the degree to which the vehicle 1 is inclined with respect to the x-axis when lane changing starts. 'f(k)' may denote a y-axis value of the vehicle 1 when an x-axis value of the vehicle 1 on the first change path IC is 'k'. That is, 'f(k)' denotes a lateral offset of the vehicle 1 from the current lane to the target lane. 'f'(k)' may denote a degree to which the vehicle 1 is inclined with respect to the x-axis when the x-axis value of the vehicle 1 on the first change path IC is 'k'. 'f''(k)' may denote a variation in the degree to which the vehicle 1 is inclined with respect to the x-axis when the x-axis value of the vehicle 1 on the first change path IC is 'k'. 'f'''(k)' may denote a variation in a steering angle of the vehicle 1 when the x-axis value of the vehicle 1 on the first change path IC is 'k'. When the variation in the steering angle is set to be '0', a safer lane change path may be generated.

In the embodiment of FIG. 2, since the first lane changing start point ISP has coordinates of (0,0) and the first lane changing end point IEP has coordinates of (D, W), f(0), f'(0), f''(0), f'(D), f''(D), and f'''(D) may be '0' and f(D) may equal to the lane width W.

The coefficients included in Equation 2 may be calculated by Equations 4 to 7 below $$a_0 = 0 \quad (4)$$

$$a_1 = \left.\frac{dy}{dx}\right|_{x=D} = 0 \quad (5)$$

$$a_2 = \left.\frac{d^2y}{2dx^2}\right|_{x=D} = 0 \quad (6)$$

$$\begin{bmatrix} a_3 \\ a_4 \\ a_5 \\ a_6 \end{bmatrix} = \begin{bmatrix} x^3 & x^4 & x^5 & x^6 \\ 3x^2 & 4x^3 & 5x^4 & 6x^5 \\ 6x & 12x^2 & 20x^3 & 30x^4 \\ 6 & 24x & 60x^2 & 120x^3 \end{bmatrix}^{-1} \left.\begin{bmatrix} f(x) - (a_0 + a_1x + a_2x^2) \\ f'(x) - (a_1 + 2a_2x) \\ f''(x) - 2a_2 \\ 0 \end{bmatrix}\right|_{x=D} \quad (7)$$

When coefficients calculated by Equations 4 to 7 are substituted in Equation 2, (x, f(x)) may be calculated in all sections in which 'x' is a value between 0 and D. As a result, the first change path IC may be calculated.

Although f(x) is expressed as a sixth-order polynomial such as Equation 2 in the above exemplary embodiment, the inventive concept is not limited thereto, and f(x) may be expressed as a fifth-order polynomial or less or a seventh-order polynomial or more according to provided information.

Figure 3:
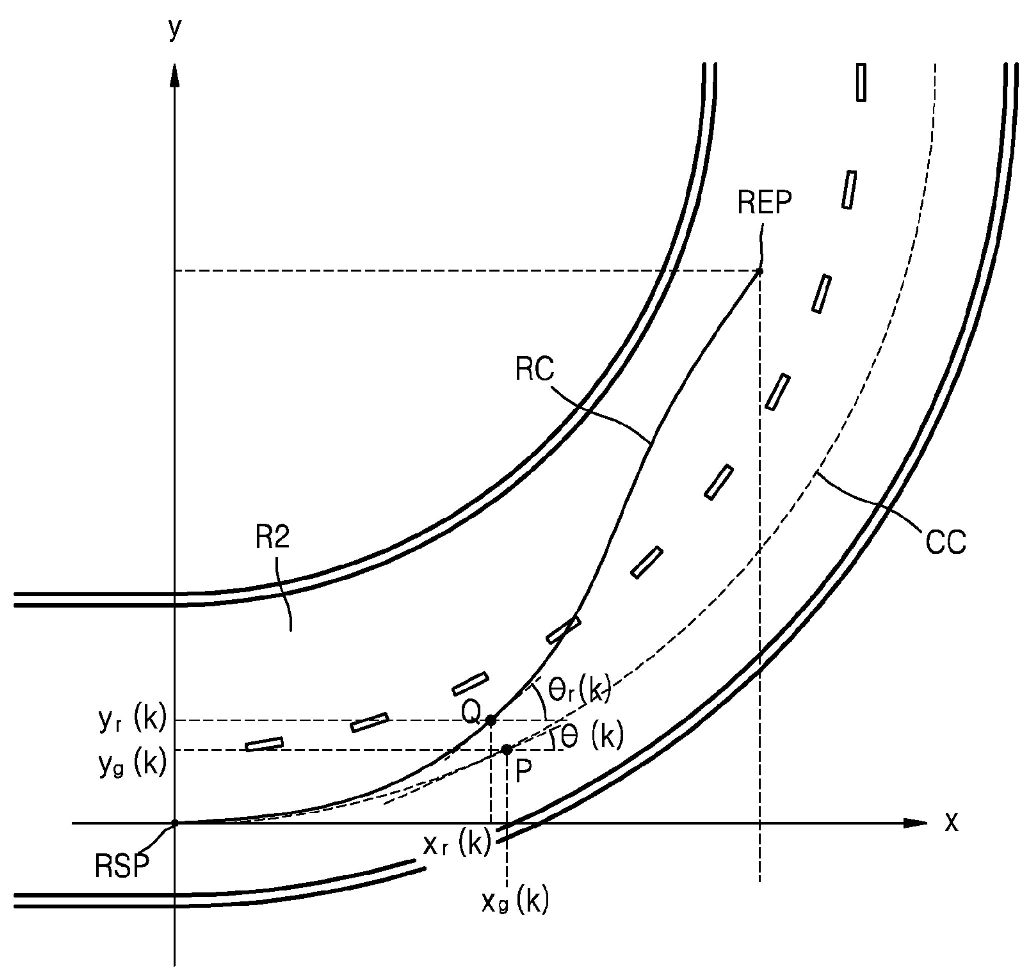
FIG. 3 is a diagram illustrating a method of generating a second change path by using a second path generator of FIG. 1, according to an exemplary embodiment.

FIG. 3 is a diagram illustrating a method of generating a second change path by using the second path generator 300 of FIG. 1, according to an exemplary embodiment.

Referring to FIG. 3, according to an exemplary embodiment, the second path generator 300 may generate a second change path RC connecting a second lane changing start point RSP and a second lane changing end point REP with respect to a vehicle 1 driving on a driving road R2.

The second path generator 300 may generate the driving road R2 corresponding to an actual road by bending a straight road to reflect a form (shape) of the actual road. For example, the second path generator 300 may generate the driving road by bending the straight road along the actual road shape (tangent and curvature). The first change path IC may be also transformed into the second change path RC to reflect the form of the road.

Locations, orientations, and curvatures of points Q on the second change path RC generated by the second path generator 300 may be calculated by Equations 8 to 11 below, based on the curvature of the actual road, i.e., the location, orientation, and curvature of a current lane of the driving road, and a polynomial representing the first change path IC.

A distance by which the vehicle 1 moves along the current lane (a centerline of the current lane) CC based on the second lane changing start point RSP as a reference point may be 'k'. It will be assumed herein that coordinates of a point Q on the second change path RC are ($x_r(k)$, $y_r(k)$) and coordinates of a point P on the current lane CC of the driving road are ($x_g(k)$, $y_g(k)$). ($x_g(k)$, $y_g(k)$) are coordinates in the current lane CC obtained through a GPS.

The coordinates ($x_r(k)$, $y_r(k)$) of the point Q on the second change path RC may be expressed by Equations 8 and 9 below, based on the coordinates ($x_g(k)$, $y_g(k)$) of the point P, f(k), and θ(k). 'θ(k)' denotes an angle formed by a tangent at the second lane changing start point RSP and a tangent at the point P on the current lane CC. That is, 'θ(k)' is a value representing orientation of the point P, and may be calculated based on a value obtained through a GPS.

$$x_r(k)=x_g(k)-f(k)\sin(\theta(k)) \quad (8)$$

$$y_r(k)=y_g(k)+f(k)\cos(\theta(k)) \quad (9),$$

where 'k' may have a value that is equal to or greater than '0' and less than or equal to 'D'. Coordinates of the second lane changing start point RSP on the driving road R2 are ($x_r(0)$, $y_r(0)$), and coordinates of the second lane changing end point REP on the driving road R2 are values obtained by offsetting ($x_g(D)$, $y_g(D)$) by −f(k)sin(θ(D)) in the x-axis direction and by f(k)cos(θ(D)) in the y-axis direction. ($x_r(0)$, $y_r(0)$) are equal to ($x_g(0)$, $y_g(0)$).

The location of the vehicle 1 and the location of the point P on the current lane CC may be GPS coordinates obtained through a GPS. The GPS coordinates may be transformed and provided in x, y coordinates.

θr(k) representing orientation of the point Q on second change path RC is an angle formed by a tangent at the second lane changing start point RSP and a tangent at the point Q. θr(k) may be expressed by Equation 10 below based on θ(k) representing the orientation of the point P. f'(k) may denote a degree to which the point P is inclined with respect to the x-axis.

$$\theta_r(k)=\theta(k)+\arctan(f'(k)) \quad (10)$$

$cur_r(k)$ representing a curvature of the point Q on the second change path RC may be expressed by Equation 11 below to reflect curvature $cur_r(k)$ of the point P on the current lane CC. Here, f''(k) may be a variation in a degree to which the point P is inclined with respect to the x-axis.

$$cur_r(k) = \frac{cur(k)}{1-cur(k)f(k)} + \frac{f''(k)}{(1+f'(k)^2)^{\frac{3}{2}}}, \quad (11)$$

where 'cur(k)' denotes curvature of an actual road when a lateral offset is '0' at a location k. The curvature of the actual road when the lateral offset is f(k) is cur(k)/(1−cur(k)×f(k)). The $cur_r(k)$ is calculated by reflecting f'(k) and f''(k) when lane changing is performed.

In the embodiment of FIG. 3, the coordinates of an origin at which the x-axis and the y-axis meet together is set to be ($x_g(0)$, $y_g(0)$) rather than (0,0), so that the coordinates of the second change path RC may be expressed as GPS coordinates. However, the inventive concept not limited thereto and the coordinates of the second change path RC may be expressed using various coordinate systems.

In FIGS. 2 and 3, the first change path IC for changing from a current lane to an adjacent lane on the straight road R1 and the second change path RC for changing from a current lane to an adjacent lane on the driving road R2 have been described as examples. However, the inventive concept is not limited thereto, and are applicable to a case in which lane changing is performed when a lane that is not adjacent to the current lane is set as a target lane, i.e., when at least one lane is present between the current lane and the target lane. For example, there is a case in which lane changing is performed n times starting from a current lane (a case in which n lanes are present between the current lane and the target lane). In this case, an x-axis value of the first lane changing end point IEP, i.e., a moving distance D, may be calculated by Equation 1 in which the constants m1 and m2 increase to be proportional to n. Also, a y-axis value of the first lane changing end point IEP may be determined to be a value obtained by multiplying the lane width W by n. When the first lane changing end point IEP is determined, the first path generator 200 may generate the first change path IC by using Equation 2. The second path generator 300 may generate the second change path RC from the first change path IC as described above with reference to FIG. 3. As described above, according to an exemplary embodiment, lane changing may be performed regardless of the number of lanes.

Figure 4:
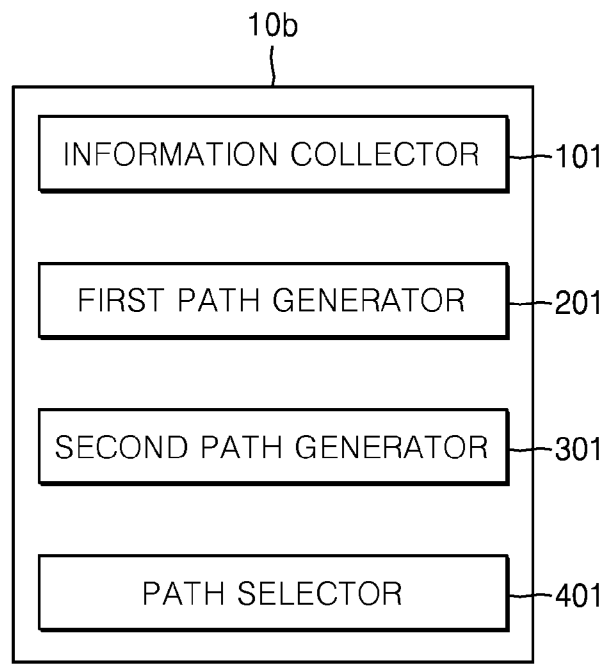
FIG. 4 is a schematic block diagram of a cruise control system, according to another exemplary embodiment.

FIG. 4 is a schematic block diagram of a cruise control system 10*b*, according to another exemplary embodiment.

Referring to FIG. 4, according to an exemplary embodiment, the cruise control system 10*b* may include an information collector 101, a first path generator 201, a second path generator 301, and a path selector 401.

Although not shown in FIG. 4, the cruise control system 10*b* may be connected to the sensor 20 and the driving controller 30 illustrated in FIG. 1. Parts of the exemplary embodiment of FIG. 4 that are the same as those of the exemplary embodiment of FIG. 1 are not be described here in detail.

The information collector 101 may obtain road information and driving information by receiving a sensing signal from the sensor 20 connected to the cruise control system 10*a*. The road information may include geometric information about a road, e.g., lanes of the road, a width of the lanes, a form (e.g., curvature) of the road, etc. The driving information may include information about movement of a vehicle, e.g., a location, a moving direction, driving speed, a steering angle, a yaw rate, and the like of the vehicle.

The first path generator 201 may generate a straight road including a current lane, a target lane, and at least one lane between the current lane and the target lane, and generate first change paths which are continuous paths connecting a first lane changing start point and first lane changing end points, respectively, on the straight road.

The second path generator 301 may generate a driving road corresponding to an actual road by reflecting a form of the actual road into the straight road obtained by the first path generator, and generate second change paths which are continuous paths connecting a second lane changing start point and second lane changing end points, respectively, on the driving road.

The path selector 401 determines degrees of risk of the second change paths input from second path generator 301, and determines a second change path, the degree of risk of which is lowest as a lane change path for a vehicle.

Figure 5:
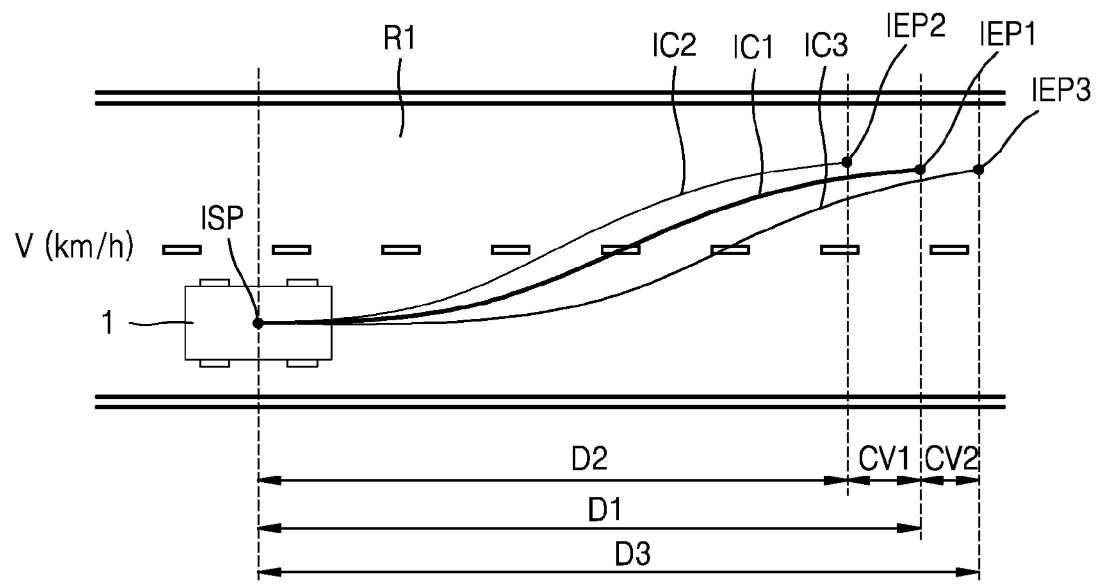
FIG. 5 is a diagram illustrating a method of generating first change paths by using a first path generator of FIG. 4, according to another exemplary embodiment.

FIG. 5 is a diagram illustrating a method of generating first change paths by using the first path generator 201 of FIG. 4, according to another exemplary embodiment. Parts of the embodiment of FIG. 5 that are the same as those of the embodiment of FIG. 2 are not described herein in detail.

Referring to FIG. 5, according to an exemplary embodiment, the first path generator 201 may generate first change paths IC1, IC2, and IC3 connecting a first lane changing start point ISP and first lane changing end points IEP1, IEP2, and IEP3, respectively, for a vehicle 1 driven along a straight road R1.

The first path generator 201 determines first to third moving distances D1, D2, and D3. The first path generator 201 may determine the first moving distance D1 as described above with reference to FIG. 2.

The first path generator 201 may set the first moving distance D1 as a reference distance, and add a predetermined correction value to or subtract the predetermined correction value from the first moving distance D1 in the x-axis direction to determine the second moving distance D2 and the third moving distance D3. For example, the first path generator 201 may determine a value obtained by subtracting a first correction value CV1 from the first moving distance D1 as the second moving distance D2, and a value obtained by adding a second correction value CV2 to the first moving distance D1 as the third moving distance D3. The first and second correction values CV1 and CV2 may be the same or different. There may be a predetermined ratio between the first and second correction values CV1 and CV2 and the first moving distance D1.

The first path generator 201 may generate a first lane changing end point IEP1 with an x-axis value corresponding to the first moving distance D1 and a y-axis value corresponding to a lane width W as coordinates, a second lane changing end point IEP2 with an x-axis value corresponding to the second moving distance D2 and the y-axis value corresponding to the lane width W as coordinates, and a third lane changing end point IEP3 with an x-axis value corresponding to the third moving distance D3 and the y-axis value corresponding to the lane width W as coordinates, based on the first lane changing start point ISP as a reference point (a starting point).

The first path generator 201 may generate the first change paths IC1, IC2, and IC3 connecting the lane changing start point ISP and the first to third lane changing end points IEP1, IEP2, and IEP3, respectively.

Each of the first change paths IC1, IC2, and IC3 may be expressed by Equations 2 to 7.

In the embodiment of FIG. 5, the first path generator 201 determines the first to third moving distances D1, D2, and D3, the first to third lane changing end points IEP1, IEP2, and IEP3 corresponding to the first to third moving distances D1, D2, and D3, and the first change paths IC1, IC2, IC3. However, the inventive concept is not limited thereto, and two or more moving distances, two or more lane changing end points corresponding to the two or more moving distances, and two or more first change paths may be determined.

Figure 6:
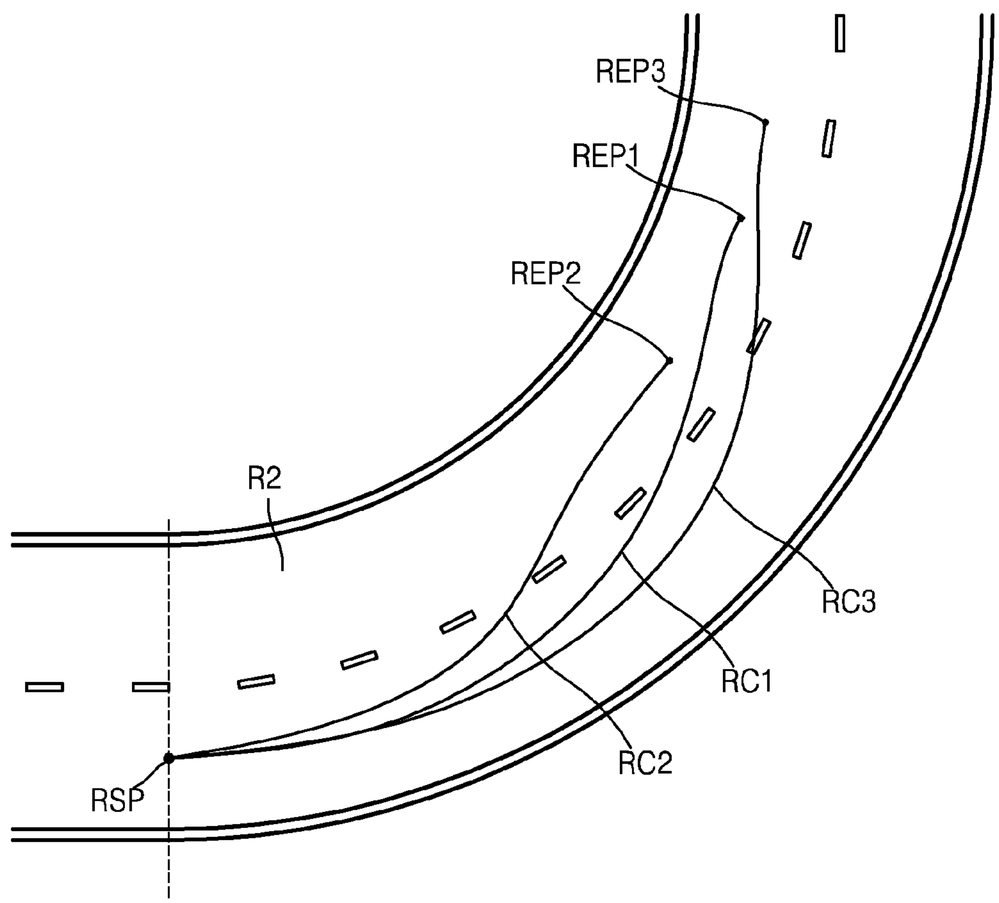
FIG. 6 is a diagram illustrating a method of generating second change paths by using a second path generator of FIG. 4 according to another exemplary embodiment.

FIG. 6 is a diagram illustrating a method of generating second change paths by using the second path generator 301 of FIG. 4, according to another exemplary embodiment. Parts of the embodiment of FIG. 6 that are the same as those of the embodiment of FIG. 3 will not be described here in detail.

Referring to FIG. 6, according to an exemplary embodiment, the second path generator 301 may generate second change paths RC1, RC2, and RC3 connecting a second lane changing start point RSP and second lane changing end points REP1, REP2, and REP3 with respect to a vehicle 1 driven along a driving road R2.

The second path generator 301 may generate the driving road R2 corresponding to an actual road by reflecting the form of the actual road into a straight road. Here, the straight road may be the road generated by the first path generator 201.

The second path generator 301 may calculate a location, orientation, and curvature of a point on each of the second change paths RC1, RC2, and RC3. The second path generator 301 may generate the second change paths RC1, RC2, and RC3, based on the location, orientation, and curvature of a point on a current lane of the driving road R2.

Figure 7:
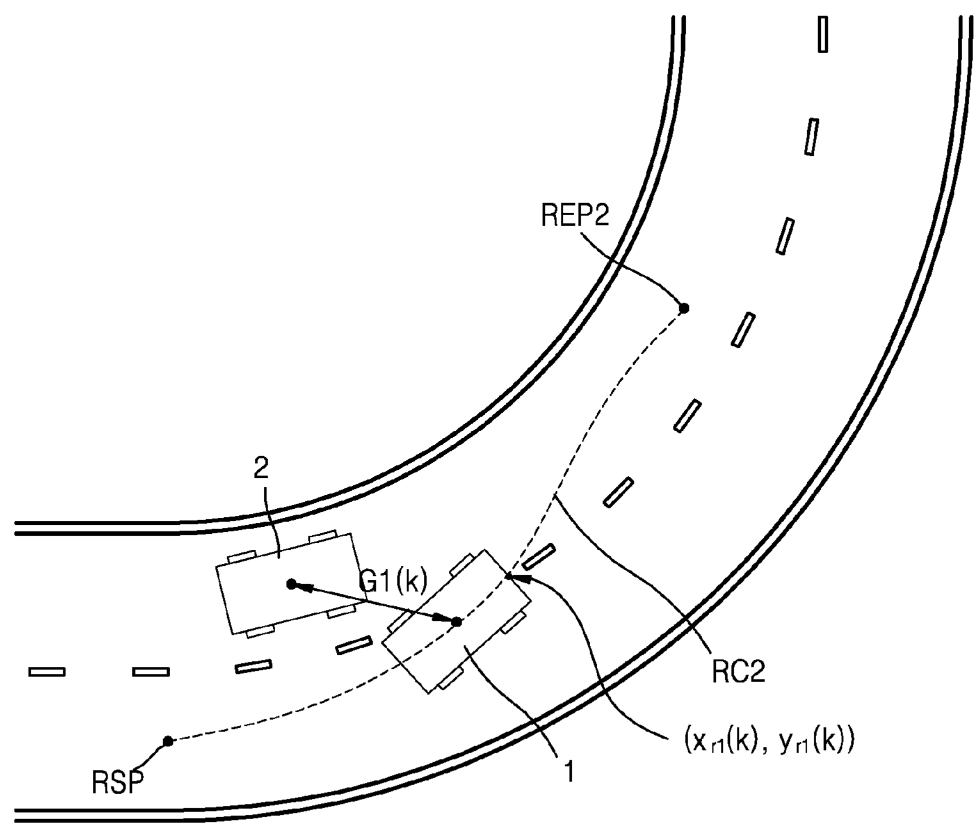
FIGS. 7 and 8 are diagrams illustrating methods of determining a degree of risk by using a path selector of FIG. 4, according to exemplary embodiments.
Figure 8:
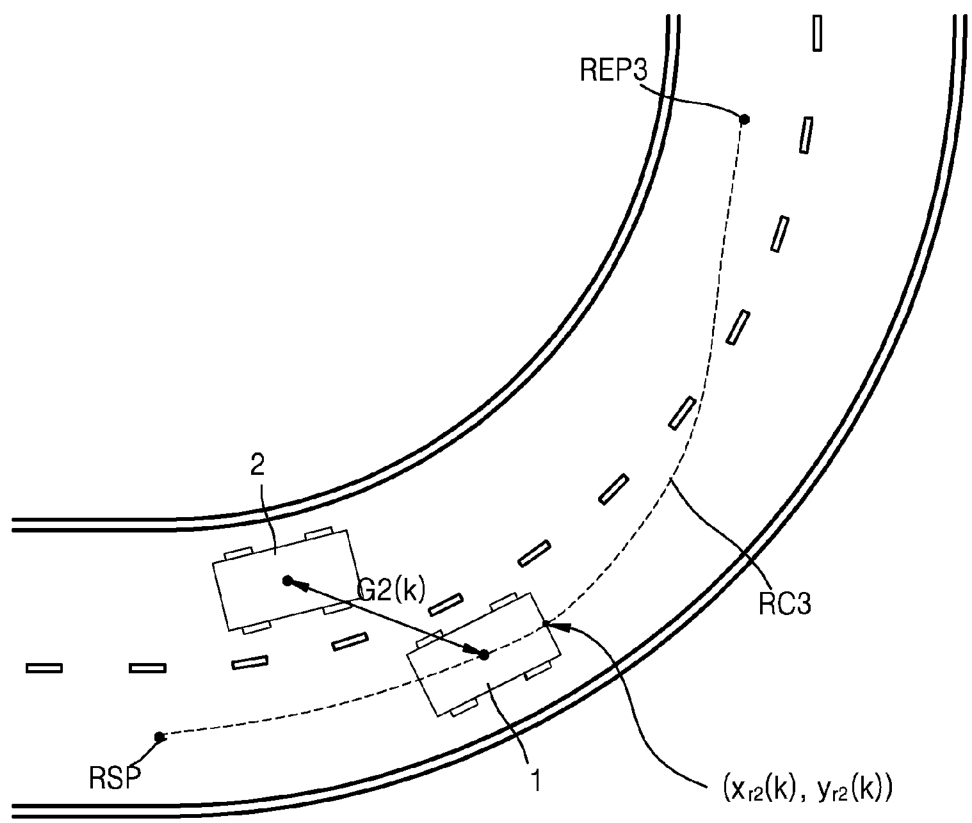

FIGS. 7 and 8 are diagrams illustrating methods of determining the degree of risk by using the path selector 401 of FIG. 4, according to exemplary embodiments.

For convenience of explanation, FIG. 7 illustrates a method of determining degrees of risks of only the second change paths RC2 and RC3 among the three second change paths RC1, RC2, and RC3 generated in the method of FIG. 6.

FIG. 7 illustrates a state of an actual road at a moment a vehicle 1 passes through a point with coordinates ($x_{r1}(k)$, $y_{r1}(k)$) to change lanes on the second change path RC2. FIG. 8 illustrates a state of an actual road at a moment a vehicle 1 passes through a point with coordinates ($x_{r2}(k)$, $y_{r2}(k)$) to change lanes on the third change path RC3. Another moving object, e.g., a vehicle 2, may be also present on the actual road. The vehicle 2 is being driven along a lane adjacent to a current lane, and the vehicle 1 is performing lane changing from the current lane to an adjacent lane.

In FIG. 7, if the distance between the vehicles 1 and 2 is G1(k) the moment the vehicle 1 passes the point with the coordinates ($x_{r1}(k)$, $y_{r1}$ (k)), the path selector 401 may determine a degree of risk ID2(k) at the moment by using Equation 12 including a constant m3 below.

$$ID2(k) = \frac{m_3}{G1(k)} \tag{12}$$

The path selector 401 may determine a maximum value among degrees of risks ID2(k) at the moment, which are calculated between the vehicle 1 that changes lanes on the second change path RC2 and the vehicle 2 at predetermined time intervals, as a degree of risk TD2 of the second change path RC2 with respect to the vehicle 2, as shown in Equation 13 below.

$$TD2=\max(ID2(k),0\le k\le D) \tag{13}$$

In FIG. 8, if a distance between the vehicles 1 and 2 is G2(k) at a moment the vehicle 1 passes through a point with coordinates ($x_{r2}(k)$, $y_{r2}(k)$), the path selector 401 may determine a degree of risk ID3(k) at the moment, based on Equation 14 including a constant m3 below.

$$ID3(k) = \frac{m_3}{G2(k)} \tag{14}$$

The path selector 401 may determine a maximum value among degrees of risks ID3(k) at the moment, which are calculated between the vehicle 1 that changes lanes on the second change path RC3 and the vehicle 2 at predetermined time intervals, as a degree of risk TD3 of the second change path RC3 with respect to the vehicle 2, based on Equation 15 below.

$$TD3=\max(ID3(k),0\le k\le D) \tag{15}$$

A degree of risk TD is inversely proportional to the distance between a vehicle that changes lanes and another vehicle, and is determined to become higher as the distance between the vehicle and the other vehicle becomes shorter while lanes are changed. Thus, the higher the degree of risk TD, the higher a probability that the vehicles will collide with each other may be.

Similarly, the path selector 401 may calculate a degree of risk TD1 of the second change path RC1, and select, as a lane change path, a path having a minimum value among the degree of risk TD1 of the second change path RC1, the degree of risk TD2 of the second change path RC2, and the degree of risk TD3 of the third change path RC3.

Although cases in which only one moving object is present near a vehicle that changes lanes have been described above with reference to FIGS. 7 and 8, the inventive concept is not limited thereto and is applicable to cases in which obstacles such as at least one moving object and at least one fixed object are present.

Figure 9:
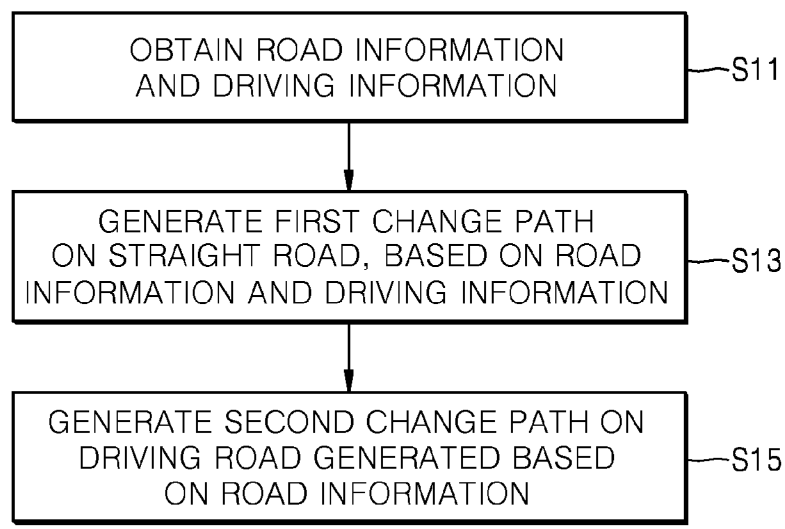
FIG. 9 is a schematic flow chart of a cruise control method performed on a driving device by using a cruise control system, according to an exemplary embodiment.

FIG. 9 is a schematic flow chart of a cruise control method performed on a driving device by using a cruise control system, according to an exemplary embodiment. Parts of the cruise control method of FIG. 9 that are the same as those of the exemplary embodiments of FIGS. 1 to 8 will not be described in detail here.

Referring to FIG. 9, the cruise control system may obtain road information and driving information by receiving a sensing signal from a sensor (operation S11). The road information may include geometric information about a road, such as lanes of the road, a width of the lanes, a form (curvature, etc.) of the road, etc. The driving information may include information about movement of a vehicle, e.g., a location, a moving direction, driving speed, a steering angle, a yaw rate, and the like thereof.

The cruise control system may generate a first change path connecting a first lane changing start point and a first lane changing end point on a straight road, based on the road information and the driving information (operation S13). The cruise control system may calculate a moving distance that is proportional to the speed of the driving device. Also, the cruise control system may determine, as the first lane changing end point, a point spaced from the first lane changing start point by the moving distance in a first axis parallel to the straight road and spaced from the first lane changing start point by a distance corresponding to the width of the lanes in a second axis perpendicular to the first axis. The first axis may be an x-axis and the second axis may be a y-axis.

The cruise control system may generate a driving road corresponding to an actual road from the straight road, based on the road information, and generate a second change path connecting a second lane changing start point and a second lane changing end point on the driving road (operation S15). The cruise control system may generate the driving road by modifying the straight road, based on a form of the actual road, i.e., curvature of the actual road. Since the curvature of the actual road varies according to a location thereof, the curvatures of the actual road at various points on the driving road may be reflected. The cruise control system may generate the second change path by calculating a location, orientation, and curvature of a point on the second change path, based on a location, orientation, and curvature of a point on a current lane of the driving road. That is, the cruise control system may generate the second change path to reflect the form of the driving road.

Figure 10:
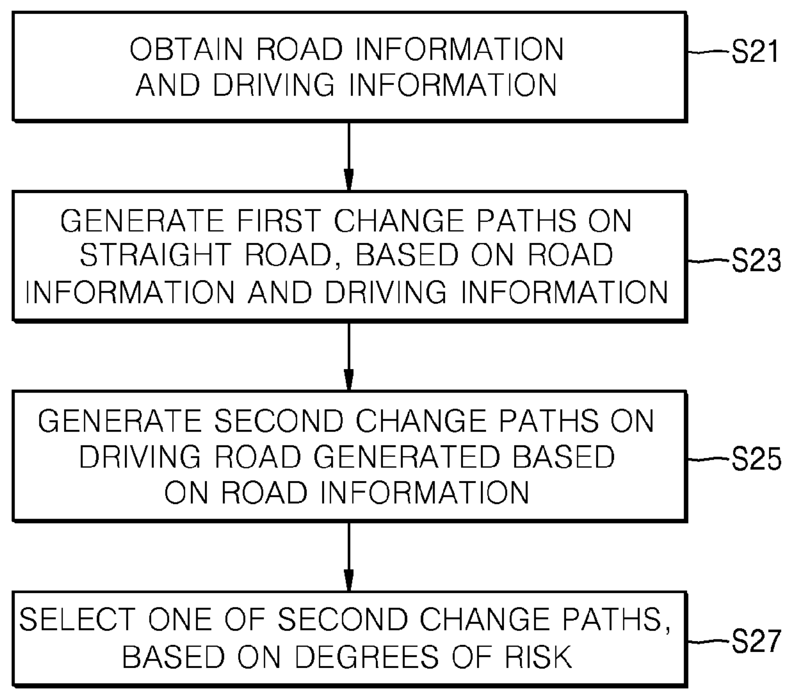
FIG. 10 is a schematic flow chart of a cruise control method performed on a driving device by using a cruise control system, according to another exemplary embodiment.

FIG. 10 is a schematic flow chart of a cruise control method performed on a driving device by using a cruise control system, according to another exemplary embodiment. Parts of the cruise control method of FIG. 10 that are the same as those of the exemplary embodiments of FIGS. 1 to 8 will not be described in detail here.

Referring to FIG. 10, the cruise control system may obtain road information and driving information by receiving a sensing signal from a sensor (operation S21). The road information may include geometric information about a road, e.g., lanes of the road, a width of the lanes, and a form (curvature, etc.) of the road, etc. The driving information may include information about movement of a vehicle, e.g., a location, a moving direction, driving speed, a steering angle, a yaw rate, and the like thereof.

The cruise control system may generate first change paths connecting a first lane changing start point and first lane changing end points on a straight road, respectively, based on the road information and the driving information (operation S23). The cruise control system may calculate moving distances that are proportional to speed of the driving device. The cruise control system may determine, as the first lane changing end points, points spaced from the first lane changing start point by one of the moving distances in a first axis parallel to the straight road and spaced from the first lane changing start point by a distance corresponding to the width of the lanes in a second axis perpendicular to the first axis. The first axis may be an x-axis and the second axis may be a y-axis. The cruise control system may calculate one of the moving distances, and additionally calculate the other moving distances by adding a predetermined correction value to the calculated moving distance and/or subtracting the predetermined correction value from the calculated moving distance. The cruise control system may generate the first lane changing end points each having one of the calculated moving distances as an x-axis value and the distance that is corresponding to the width of the lanes as a y-axis value.

The cruise control system may generate a driving road corresponding to an actual road from the straight road, based on the road information, and second change paths connecting a second lane changing start point and second lane changing end points, respectively, on the driving road (operation S25). The cruise control system may generate the driving road by modifying the straight road based on a form of the actual road. The cruise control system may generate the second change paths by calculating a location, orientation, and curvature of a point on each of the second change paths, based on a location, orientation, and curvature of a point on a current lane on the driving road.

The cruise control system may determine degrees of risk of the second change paths, and select, as a lane change path, a second change path, the degree of risk of which is minimum among the second change paths (operation S27). A degree of risk is a value representing a probability that the driving device will collide with a moving object near the driving device when the driving device changes lanes while moving along the second change path. The degree of risk is inversely proportional to the distance between the driving device and the moving object near the driving device.

According to an exemplary embodiment, the cruise control system is capable of decreasing a time required to generate a path for changing lanes regardless of curvature (linear or curved curvature) of a road.

According to an exemplary embodiment, the cruise control system is applicable to a case in which lane changing is performed again to return to the original lane after lane changing is performed, provided that initial conditions are changed.

As described above, according to the above exemplary embodiments, a cruise control system and method are capable of providing a safe lane change path in which lane changing can be performed without invading lanes other than a current lane and a lane to be moved to on a road.

A cruise control method according to the above exemplary embodiments can be realized as computer-readable code on a computer-readable recording medium. The computer-readable recording medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the inventive concept may be stored and implemented as computer readable code in the distributed system. A functional program, code, and code segments for implementing the inventive can be easily derived by programmers in the technical field to which the inventive concept belongs.

It should be understood that the above exemplary embodiments should be considered in a descriptive sense only and not for purposes of limitation. Descriptions of features or aspects within each embodiment should typically be considered as available for other similar features or aspects in other embodiments.

While the above exemplary embodiments have been described with reference to the drawings, it will be understood by those of ordinary skill in the art that various changes in form and details may be made therein without departing from the spirit and scope of the inventive concept as defined by the following claims.

What is claimed is:

1. A cruise control system for controlling a driving device, the system comprising:
- at least one processor to implement:
- an information collector to obtain road information and driving information;
- a first path generator to generate a first change path connecting a first lane changing start point and a first lane changing end point on a straight road, based on the road information and the driving information; and
- a second path generator to generate a driving road by modifying the straight road according to a shape of an actual road, based on the road information, and
- generate a second change path on the driving road by connecting a second lane changing start point and a second lane changing end point that are respectively modified from the first lane changing start point and the first lane end point as the straight road is modified to the driving road.

2. The cruise control system of claim 1, wherein the driving information comprises speed of the driving device, and
- wherein the road information comprises a width of at least one lane in the actual road and a shape of the actual road.

3. The cruise control system of claim 2, wherein the first path generator calculates a moving distance that is proportional to the speed of the driving device, and determine, as the first lane changing end point, a point spaced from the first lane changing start point by the moving distance in a first axis parallel to the straight road and spaced from the first lane changing start point by a distance corresponding to a width of the lane in a second axis perpendicular to the first axis.

4. The cruise control system of claim 2, wherein the first path generator calculates a plurality of moving distances that are proportional to the speed of the driving device, and determine, as a plurality of first lane changing end points, points spaced from the first lane changing start point by one of the plurality of moving distances in a first axis parallel to the straight road and spaced from the first lane changing start point by a distance corresponding to the width of the lane in a second axis perpendicular to the first axis.

5. The cruise control system of claim 4, wherein the second path generator generates a plurality of second change paths connecting a second lane changing start point and a plurality of second lane changing end points, respectively, on the driving road, wherein the second lane changing start point corresponds to the first lane changing start point, and wherein the plurality of second lane changing end points correspond to the plurality of first lane changing end points, respectively.

6. The cruise control system of claim 5, further comprising a path selector configured to determine a degree of risk of each of the plurality of second change paths, and select one second change path, of which the degree of risk is minimum, among the plurality of second change paths.

7. The cruise control system of claim 6, wherein the degree of risk is a value representing a probability that the driving device collides with a moving object near the driving device while the driving device moves along the second change path.

8. The cruise control system of claim 7, wherein the degree of risk is inversely proportional to a distance between the driving device and the moving object.

9. The cruise control system of claim 2, wherein the second path generator generates the driving road by bending the straight road along the shape of the actual road.

10. The cruise control system of claim 1, wherein the second path generator generates the second change path based on a location, orientation, and curvature of a point on a current lane of the driving road.

11. A cruise control method for controlling a driving device, the method comprising:
- obtaining, by a cruise control device, road information and driving information;
- Generating, by the cruise control device, a first change path connecting a first lane changing start point and a first lane changing end point on a straight road, based on the road information and the driving information; and
- generating, by the cruise control device, a driving road by modifying the straight road according to a shape of an actual road, based on the road information, and generating a second change path on the driving road by connecting a second lane changing start point and a second lane changing end point that are respectively modified from the first lane changing start point and the first lane end point as the straight road is modified to the driving road.

12. The method of claim 11, wherein the driving information comprises speed of the driving device, and
- wherein the road information comprises a width of at least one lane in the actual road and a shape of the actual road.

13. The method of claim 12, wherein the generating the first change path comprises:
- calculating a moving distance that is proportional to the speed of the driving device; and
- determining, as the first lane changing end point, a point spaced from the first lane changing start point by the moving distance in a first axis parallel to the straight road and spaced from the first lane changing start point by a distance corresponding to a width of the lane in a second axis perpendicular to the first axis.

14. The method of claim 12, wherein the generating the first change path comprises:

calculating a plurality of moving distances that are proportional to the speed of the driving device; and determining, as a plurality of first lane changing end points, points spaced from the first lane changing start point by one of the plurality of moving distances in a first axis parallel to the straight road and spaced from the first lane changing start point by a distance corresponding to the width of the lane in a second axis perpendicular to the first axis.

15. The method of claim 14, wherein the generating the second change path comprises:

generating a plurality of second change paths connecting a second lane changing start point and a plurality of second lane changing end points, respectively, on the driving road, wherein the second lane changing start point corresponds to the first lane changing start point, and wherein the plurality of second lane changing end points correspond to the plurality of first lane changing end points, respectively.

16. The method of claim 15, further comprising determining a degree of risk of each of the plurality of second change paths, and selecting one second change path, of which the degree of risk is minimum, among the plurality of second change paths.

17. The method of claim 16, wherein the degree of risk is a value representing a probability that the driving device collides with a moving object near the driving device while the driving device moves along the second change path.

18. The method of claim 17, wherein the degree of risk is inversely proportional to a distance between the driving device and the moving object.

19. The method of claim 12, wherein the generating of the second change path comprises generating the driving road by modifying the straight road based on the shape of the actual road.

20. The method of claim 11, wherein the generating of the second change path comprises generating the second change path based on a location, orientation, and curvature of a point on a current lane of the driving road.

* * * * *